United States Patent [19]
Sone et al.

[11] 3,988,064
[45] Oct. 26, 1976

[54] READER-PRINTER

[75] Inventors: Yoshiaki Sone; Takamasa Sawada, both of Tokyo, Japan

[73] Assignee: Canon Kabushiki Kaisha, Tokyo, Japan

[22] Filed: Oct. 31, 1974

[21] Appl. No.: 519,776

[30] Foreign Application Priority Data
Nov. 13, 1973 Japan.............................. 48-127539
Nov. 13, 1973 Japan.............................. 48-127540
Dec. 21, 1973 Japan................................ 48-2067

[52] U.S. Cl.................................. 355/41; 355/43; 355/45; 355/66
[51] Int. Cl.².................................... G03B 27/52
[58] Field of Search ................ 355/5, 45, 66, 43, 41

[56] References Cited
UNITED STATES PATENTS

| | | |
|---|---|---|
| 3,094,036 | 6/1963 | Benson ............................ 355/45 X |
| 3,674,354 | 7/1972 | Artaud et al............................ 355/5 |
| 3,698,807 | 10/1972 | Weigl.................................... 355/45 |
| 3,733,128 | 5/1973 | Naumann et al. .................... 355/45 |
| 3,740,136 | 6/1973 | Maloney et al....................... 355/43 |

Primary Examiner—Richard A. Wintercorn
Attorney, Agent, or Firm—Fitzpatrick, Cella, Harper & Scinto

[57] ABSTRACT

A reader-printer comprises means for illuminating a film, lens means for projecting therethrough an image in the film, a viewing screen, a photosensitive medium, means for moving the photosensitive medium, and means for causing the photosensitive medium to be slit-exposed to the image in the moving film. Light splitting means is provided in the optical path of image projection so as to split part of the image light projected through the lens means to travel toward the viewing screen and the photosensitive medium so that only part of the image light projected upon the viewing screen is directed to the photosensitive medium.

24 Claims, 10 Drawing Figures

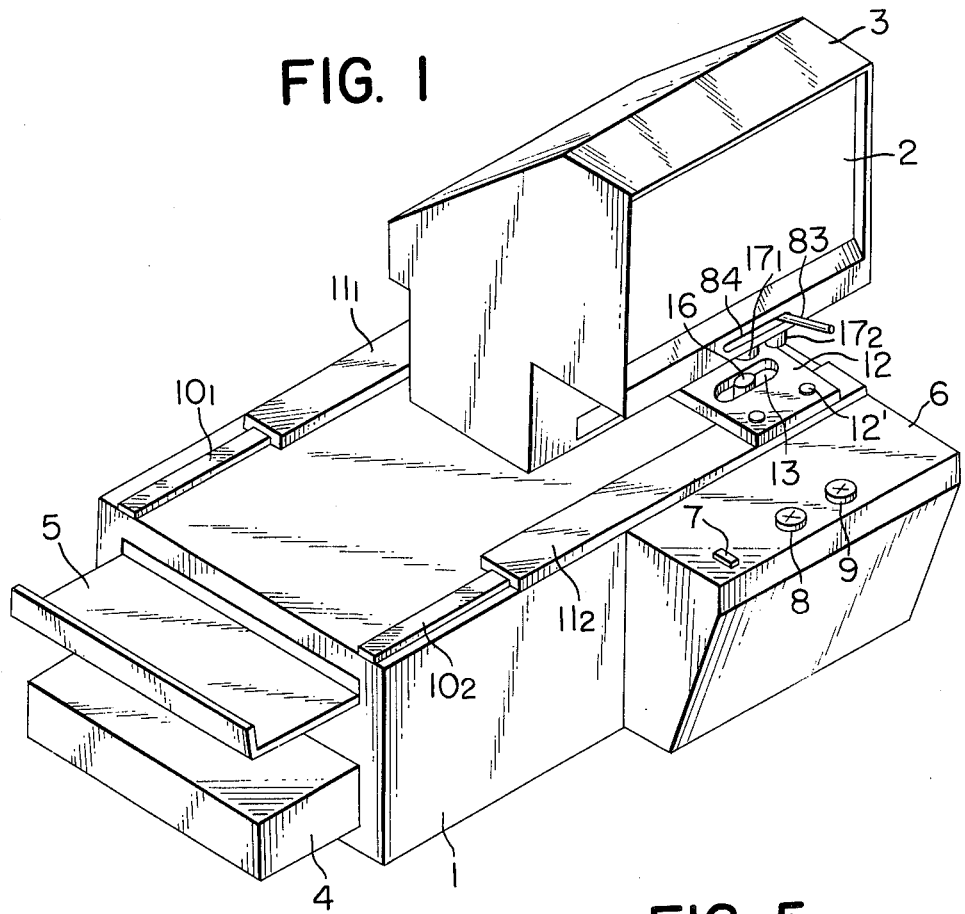
FIG. 1
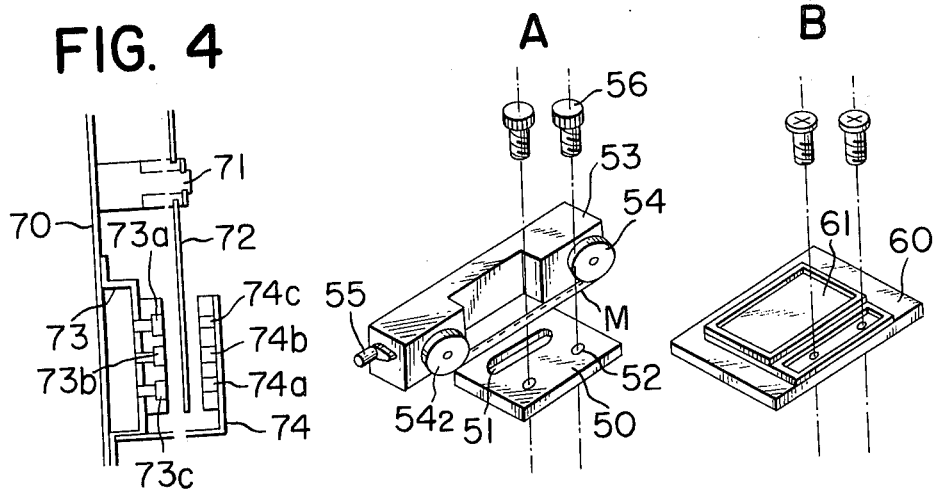
FIG. 4
FIG. 5

READER-PRINTER

BACKGROUND OF THE INVENTION

1. Field of the Invention

This invention relates to a reader-printer in which a recorded image in a film may be projected and observed on a viewing screen and in which a desired image may be projected upon a photosensitive medium to provide a print, and more particularly to a reader-printer which attaches importance to the printing function and can accomplish mass production of prints at high speeds.

2. Description of the Prior Art

Reader-printers have been used to record the images of subjects in a microfilm on a reduced scale and to observe the recorded images in the microfilm or to have them printed. The printing systems in the conventional reader-printers have been of the silver salt stabilization type, the electrofax type, the diazo type or the dry silver type, and any of these printing systems has involved a stationary exposure process which is an overall exposure effected on stationary sensitive paper as is done on the screen. In addition to these systems, a printing system using a movable electrophotographic sensitive medium is known which adopts slit-exposure to effect exposure on the photosensitive medium as it is moved.

SUMMARY OF THE INVENTION

It is an object of the present invention to provide a reader-printer which incorporates the printing system using a movable photosensitive medium.

It is another object of the present invention to provide a novel reader-printer which may produce prints through the slit-exposure system as a photosensitive medium and a film are moved synchronously.

It is still another object of the present invention to provide a reader-printer which may produce clear and good printed images by effecting slit-exposure from a position in which one end of the image on a film is aligned with the optical axis of a projection lens.

To achieve the above objects, the reader-printer of the present invention comprises means for illuminating a film, lens means for projecting therethrough an image in the film, a viewing screen, a photosensitive medium, means for moving the photosensitive medium, and means for causing the photosensitive medium to be slit-exposed to the image in the moving film. A feature of the present invention is that light splitting means is provided in the optical path of image projection so as to split part of the image light projected through the lens means to travel toward the viewing screen and the photosensitive medium so that only part of the image light projected upon the viewing screen is directed to the photosensitive medium. Another feature of the present invention is that means is provided for displacing the film between read-out position and print position. The displacing means is operable, during printing, to displace the film from the film read-out position in which the projected image is viewed on the screen to the print position in which one end of the projected image is aligned with the optical axis of the lens means.

Other objects ond features of the present invention will become fully apparent from the following detailed description of specific embodiments taken in conjunction with the accompanying drawings.

BRIEF DESCRIPTION OF THE DRAWINGS

FIG. 1 is a perspective view schematically showing the construction of the reader-printer according to the present invention.

FIG. 4 is a side view of a position detecting mechanism.

FIGS. 5A and B are perspective views of a film carrier.

DESCRIPTION OF THE PREFERRED EMBODIMENTS

Figure 2:
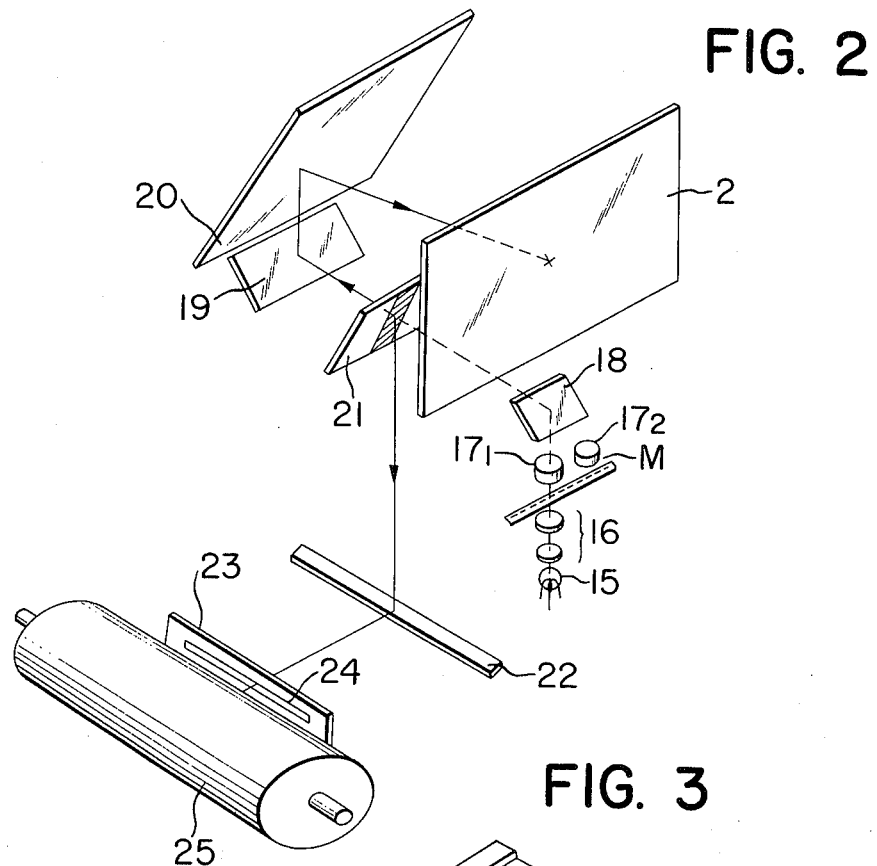
FIG. 2 schematically shows the optical system in the reader-printer.

Referring to FIG. 1, there is shown a microfilm readerprinter using an electrophotographic system for copying. A main body 1 accomodates therein a photosensitive drum for electrophotography and processing devices therefor. On top of the main body 1, there is disposed a viewing portion 3 having a viewing screen 2. A paper feed unit 4 is removably mounted to the main body 1 and may be replaced by any one of other various size units. During copying, paper may be fed from within the feed unit toward a transfer portion. The paper, printed through the transfer portion, may be discharged onto a paper reception unit 5.

An operating board 6 has a group of switches such as main switch 7, print button 8, light-quantity adjusting dial 9, etc.

A pair of parallel rails $10_1$ and $10_2$ are mounted on top of the main body 1, and movable members $11_1$ and $11_2$ are slidable on these rails and have a film carrier mounting bed 12 mounted thereon. The carrier mounting bed 12 has an illuminating window 13 and a light-directing opening 14 and is movable with the movable members $11_1$ and $11_2$ (see FIG. 3). A plurality of film carriers are selectively and removably mounted on the film carrier mounting bed 12 in accordance with various forms of film which will hereinafter be described.

A light source 15 and a condenser lens 16, which together form an illuminating system, is fixedly provided within the main body 1 (see FIG. 2), and the condenser lens 16 partly extends into the illuminating window in the carrier mounting bed. A plurality of projection lenses $17_1$ and $17_2$ having different focal lengths are disposed in the lower portion of the viewing portion 3 and in opposed relationship with the condenser lens 16.

Figure 6:
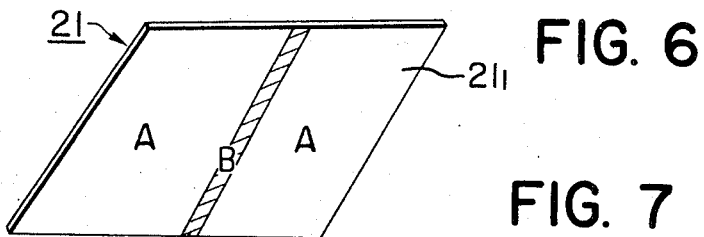
FIG. 6 is a perspective view of a transparent member.

FIG. 2 shows the optical system of the above-described reader-printer. The light from the source 15 passes through the condenser lens 16 to illuminate one frame of image in microfilm M. The optical image of the microfilm M is passed through the projection lens $17_1$ disposed on the optical path of the illuminating system, and further directed via mirrors 18, 19, 20 for projection upon the screen 2. A transparent member 21 having a part thereof made translucent is obliquely disposed on the optical path passing through the mirrors 18 and 19. As shown in FIG. 6, the transparent member 21 comprises a transparent glass plate 21 with aluminum deposited by evaporation in the form of elongated deposited portion $21_2$ in the middle thereof, so as to provide a translucent half-mirror portion, which reflects and transmits the light passed through the optical axis of an objective lens. The translucent portion, designated by B, is suitably set to have transmittivity of about 20 to about 80% and reflection factor of about 80 to about 20%. On the other hand, the other or transparent portion A is made to have transmittivity of about 100%. As a result, part of the image projected from the film is reflected by the translucent portion B of the transparent member and the reflected light beam is directed through the light-directing opening 14 in the carrier mounting bed to a mirror 22 disposed therebelow, while a light beam passed through the transparent portion A and the translucent portion B is directed via the mirrors 19 and 20 to the viewing screen 2. The light reflected by the mirror 22 passes through a slit 24 formed in a slit plate 23 to effect slit-exposure on a photosensitive drum 25 rotating at a predetermined velocity, the drum 25 comprising three layers — an electrically conductive layer, a photoconductive layer and an insulative layer.

Figure 8:
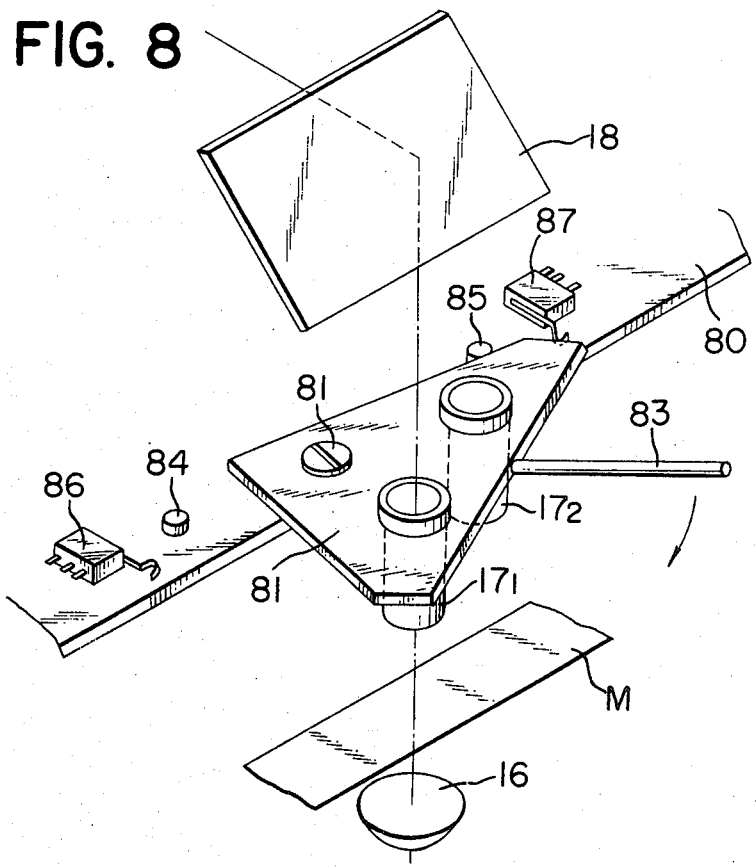
FIG. 8 is a perspective view showing the essential portions of a lens change-over portion.

The projection lenses $17_1$ and $17_2$, as shown in FIG. 8, are attached to a turret plate 81 rotatably disposed on a support plate 80 provided below the viewing portion 3.

The turret plate 81 is pivotally supported on the support plate 80 by means of a shaft 82 and operably for rotation by means of an operating member 83 projected outwardly from a hole 84 formed in the front face of the viewing portion 3. In front of the viewing screen, the viewer can operate the operating member 83 to the right or to the left to change over either of the projection lenses so as to lie in the illuminating system, thereby changing the magnification of projection as desired.

The support plate 80 is provided thereon with stops 84, 85 for limiting the range of rotation of the turret plate 81 and microswitches 86, 87 for detecting the change-over of the lenses. When the turret plate 81 engages one of the stops, one end of the turret 81 will actuate one of the microswitches. When this occurs, the selected one of the projection lenses will lie in the center of the optical path. In FIG. 8, the projection lens $17_1$ is shown to lie on the optical path.

Figure 3:
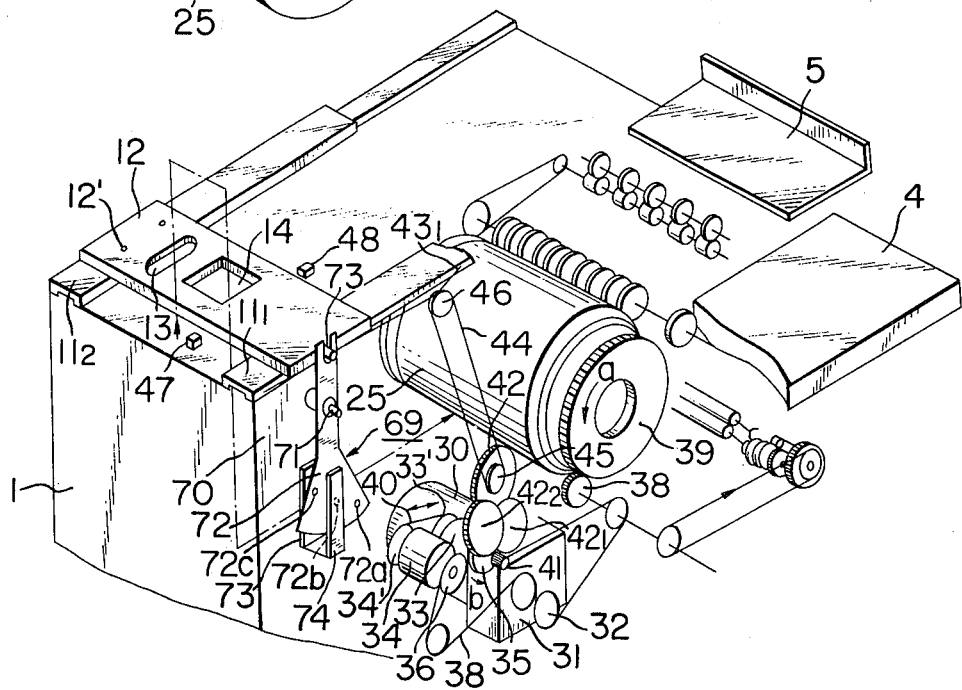
FIG. 3 is a perspective view showing the drive system in the reader-printer.

FIG. 3 shows a drive system for the carrier mounting bed and the photosensitive drum. The drive of a drive motor 30, which effects constant drive in a predetermined direction, is transmitted through a reduction mechanism 31 to a sprocket gear 32. A forward clutch 33 and a backward clutch 34 respectively have sprocket gears 35 and 36 rotatably mounted on their rotary shafts at one end. There is another sprocket gear 37. An endless chain 38 extends over the sprocket gears 35, 36, 37 and the sprocket gear 32 of the reduction mechanism so that the rotational force of the sprocket gear 32 is transmitted to the sprocket gear 37 by the chain 38. An intermediate gear 38 mounted coaxially on the rotary shaft of the sprocket gear 37 meshes with a gear 39 integral with the photosensitive drum 25 to cause the photosensitive drum 25 to be rotated at a constant speed in the direction of arrow $a$ by rotation of the sprocket gear 37.

Sprocket gears 33' and 34' are securely mounted on the other ends of the rotary shafts of the forward and backward clutches 33 and 34, and a chain 40 extends over these two sprocket gears 33' and 34'.

A pinion gear 41 is securely mounted on the rotary shaft of the forward clutch 33 and meshes with one of speed changing intermediate gears $42_1$ and $42_2$. An auxiliary gear $42_3$ is integrally formed with the intermediate gear $42_2$, and this auxiliary gear $42_3$ and the intermediate gear $42_1$ are in meshing engagement with a large gear 42. A wire 44 having its opposite ends attached to pins $43_1$ and $43_2$ of the movable member $11_1$ is wound around a pulley 45 integral with the large gear 42 and also around an idler pulley 46 so as to reciprocate the movable member $11_1$ in accordance with the direction of rotation of the pulley 45.

Figure 9:
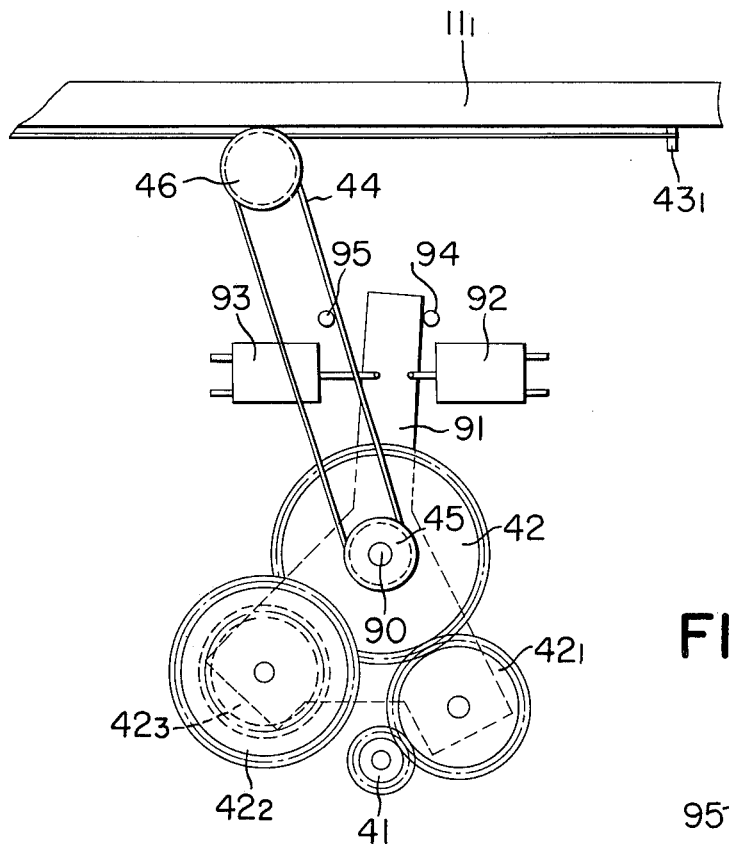
FIG. 9 is a front view showing the essential portions of a speed changing portion.
Figure 10:
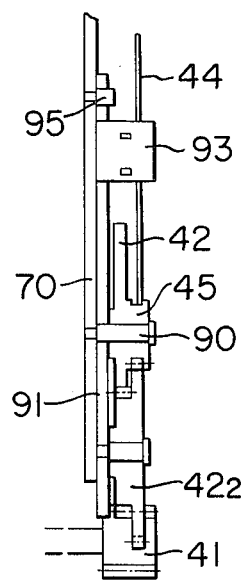
FIG. 10 is a side view of the speed changing portion shown in FIG. 9.

The large gear 42 and the intermediate gears $42_1$, $42_2$, as shown in FIGS. 9 and 10, are respectively mounted on an inverted Y-shaped movable plate 91 pivotally supported by a pin 90 studded in a base plate 70 within the main body. Pivotal movement of the movable plate 91 will bring one of the intermediate gears $42_1$ and $42_2$ into meshing engagement with the pinion gear 41 to thereby drivingly connect the pinion gear 41 to the large gear 42.

The movable plate 91 is pivotable about the pin 90 upon energization of solenoids 92 and 93 disposed with the movable plate therebetween, and the range of such pivotal movement is limited by stops 94 and 95 provided on the base plate 70.

The solenoids 92 and 93 are associated with microswitches 86 and 87, respectively, so that when one of the microswitches is actuated upon change-over of the projection lens the signal from that microswitch energizes one of the solenoids to pivot the movable plate 91. The pivoting of the movable plate 91 brings selected one of the intermediate gears into meshing engagement with the pinion gear 41 to rotate the pulley 45.

Let the magnifications of the projection lenses $17_1$ and $17_2$ be $\alpha$ and $\beta$ (but $\alpha<\beta$). As to the relationship between the magnifications of the projection lenses and the gear ratio of the intermediate gears $42_1$ and $42_2$, the gear ratio $42_2$ of the intermediate gear $42_2$ is set such that the peripheral speed of the pulley 45 is $\alpha/\beta$ during meshing engagement of the pinion gear 41 with the intermediate gear $42_2$ if the peripheral speed of the pulley 45 is unity during the meshing engagement of the pinion gear 41 with the intermediate gear $42_1$.

The clutches 33 and 34 for changing the direction of rotation of the pinion gear 41 are such that when the forward clutch 33 assumes its ON position it is connected to the sprocket gear 35 for rotation together. This causes the pinion gear 41 to be rotated in the direction of arrow $b$. When the backward clutch 34 assumes its ON position, it is connected to the sprocket gear 36 for rotation together. This causes the chain 40 and sprocket gear 33' to rotate the rotary shaft of the forward clutch 33, thereby rotating the pinion gear 41 now in the opposite direction. Thus, actuation of one of the two clutches causes selected one of the intermediate gears to change the direction of rotation of the large gear 42 as desired, to reciprocally drive the carrier mounting bed 12 in the forward and backward directions so as to transport the film during printing. In the OFF positions of the two clutches 33 and 34, the pinion gear is not rotated so that the drive to the carrier mounting bed 12 is stopped while the photosensitive drum continues to rotate.

A mechanism 69 for detecting the position of the carrier mounting bed is shown in FIGS. 3 and 4. A lever 72 is pivotally mounted on a pin 71 studded in the base plate 70 of the main body 1 and has one end formed like a fork and engaged with a pin 73 studded in a side edge portion of the carrier mounting bed 12. The other or lower end of the lever 72 is formed like a sector provided with three light-transmitting apertures 72a, 72b and 72c suitably spaced from one another. The lever 72 is pivotable with movement of the carrier mounting bed 12 so that the portion of the lever 72 which is provided with the apertures 72a, 72b and 72c is moved over a distance greater than the distance of travel of the carrier mounting bed 12 to thereby enlarge the amount of movement of the bed 12, thus enabling the detecting mechanism to accurately detect the position of the carrier mounting bed. In the embodiment now under discussion, the apertured portion of the lever 72 is moved three times as much as the amount of movement of the carrier mounting bed.

If a subject of size A3 is recorded on a reduced scale of 1/15 in 35 mm microfilm, and the image in such microfilm is to be enlarged and printed in its original size, the distance of travel of the carrier mounting bed 12 will be only 420 mm. Therefore, during such a small distance of travel, it is not easy to accurately detect the position of the carrier mounting bed, namely, the positions of the center and ends of the image in the film. The detection would be more difficult particularly in the case of microfilm having more minute size of images therein. The above-described mechanism enables accurate detection of the position of the image recorded in the film.

The base plate 70 is also provided thereon with a hold plate 73 for supporting three light-sensing elements 73a, 73b, 73c and a hold plate 74 for supporting three lamps 74a, 74b, 73c. The respective light-sensing elements 73a, 73b, 73c and lamps 74a, 74b, 73c are disposed with the lever 72 therebetween and in opposed relationship with each other. When an image in one frame of film is being projected upon the screen at the center thereof and observed by a viewer, the film is in a read-out position where the center of the image frame is aligned with the optical axis of the projection lens and at this time, the light-sensing element 73b receives the light from the lamp 74b through the aperture 72b in the lever (the position shown in FIG. 3). When this occurs, the other light-sensing elements 73a and 73c do not receive the light from their associated lamps. As the lever is pivoted clockwise with the movement of the carrier mounting bed, the light-sensing element 73a now receives the light from the lamp 74a through the aperture 72a. As the lever is pivoted counter-clockwise, the light-sensing element 73c receives the light from the lamp 74c through the aperture 72c.

When the light-sensing element 72a receives light, the film is in a print start position where one end of the image frame is aligned with the optical axis of the projection lens, and when the light-sensing element 72c receives light, the film is in a print terminating position where the other end of the image frame is aligned with the optical axis of the projection lens.

FIG. 5A shows a roll film carrier which is to be mounted on the above-described carrier mounting bed. The roll film carrier 50 is formed with an illuminating window 51 of the same configuration as the illuminating window of the carrier mountiing bed, and also formed with threaded holes 52. The roll film carrier has a side wall 53 having a film supply reel $54_1$ and a film takeup reel $54_2$ both rotatably mounted thereon, and a rolled microfilm M is wound on and extended from the film supply reel to the film takeup reel.

The rolled microfilm M may be supplied by manually turning a handle 55 provided on the side wall 53.

The film carrier 50 is placed on the carrier mounting bed 12 with the threaded holes 52 aligned with the threaded holes 12' formed in the carrier mounting bed 12, and screws 56 are threadably inserted in the aligned holes to secure the film carrier 50 to the carrier mounting bed.

FIG. 5B shows a fiche carrier using a fiche film. The fiche carrier 60 is designed such that a microfiche may be inserted between two transparent glass plates 61 disposed over the illuminating window, the glass plates being movable in any horizontal direction to position a particular frame on the illuminating window.

The fiche carrier 60 may be mounted on the carrier mounting bed interchangeably with the aforesaid film carrier. The film carrier is not restricted to the above-described forms, but other various forms of carrier may interchangeably be used such as apertured card carrier, carrier provided with automatic seach means, or carrier ffor the card provided with automatic card feed means.

In the above-described apparatus, the photosensitive drum, various electrophotographic process mechanisms, paper feed mechanism, etc. are known from U.S. Pat. 3,804,512 and these need not be described in detail.

Operation of the above-described reader-printer will now be explained. For example, the film carrier 50 is mounted on the carrier mounting bed 12 and main switch 7 is first closed to turn on the light source 15 while permitting power supply to the other mechanisms. The light beam passed through the microfilm M passes through the projection lens, inserted in the optical path, and is reflected by the mirrors 18, 19, 20 and projected upon the screen 2. Although the image so projected on the screen 2 is more or less dark in the center region thereof because the light passed through the translucent portion B of the transparent member is decreased in quantity, the center region of the image is still intelligible and most of the image on the screen is clear because almost all the other part of the transparent member passes light therethrough, and thus, the image on the screen can generally be observed easily. If an image is to be projected by the use of a projection lens $17_1$ of magnification $\alpha$, the operating member 83 is operated to displace such projection lens $17_1$ of magnification $\alpha$ onto the optical path of the illuminating system (see the position shown in FIG. 7), thereby changing the magnification of the image projected on the screen. With the change-over of the lens, one end of the turret plate 81 engages the microswitch 87, whereupon this microswitch 87 generates an electrical signal to energize the solenoid 92. As a result, the movable plate 91 is rotated clockwise until it engages the stop 94 (see the position shown in FIG. 9), whereby intermediate gear $42_1$ is brought into meshing engagement with the pinion gear 41 and the pinion gear 41 is drivingly coupled to the large gear 42 through the agency of the intermediate gear $42_1$.

Figure 7:
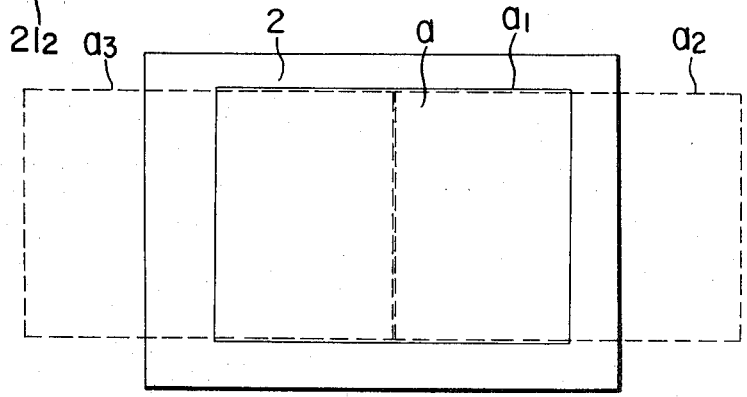
FIG. 7 is a view illustrating the image as projected upon a screen.

Subsequently, by rotating the handle 55 of the film carrier to feed the film, the image in each frame projected upon the screen at a selected magnification may be viewed in succession. When a desired image has been projected upon the screen 2, the film is stopped. The then relationship between the screen 2 and the projected image $a$ is shown in FIG. 7. In FIG. 7, the projected image $a$ corresponding to one frame of the film lies in the middle of the screen 2 as indicated by solid outline $a_1$. At this time, the film is in the position where the center of the image frame is aligned with the optical axis of the projection lens $17_1$, so that the light-sensing element $73b$ receives the light from the lamp $74b$. In this position, when the print button 8 is depressed, the drive motor 30 is driven to rotate the photosensitive drum 25 at a predetermined velocity while bringing the backward clutch 34 into ON position. With the backward clutch 34 brought into ON position, the carrier mounting bed 12 is moved to transport the film at a velocity corresponding to the magnification of projection and in response thereto, the lever 72 is rotated clockwise. When a signal generated by the light-sensing element $72a$ receiving the light as the result of rotation of the lever brings the backward clutch into OFF position, the film is displaced to a position where one end of the image frame is aligned with the optical axis of the projection lens $17_1$, whereupon the carrier mounting bed 12 is stopped. At this time, the image $a$ in one frame is projected at the position indicated by a broken outline $a_2$ on the screen 2. Subsequently, a signal from a control system opens unshown shutter of the printer device and brings the forward clutch 33 into ON position, whereupon the carrier mounting bed 12 is moved now in the opposite direction and the image in the moving film is projected upon the photosensitive drum 25 rotating in synchronism with the film. The image in the film is reflected by the translucent portion B of the transparent member and directed via the mirror 22 and through the slit plate 23 onto the photosensitive drum 25, which is thus slit-exposed from the end of the image. By the movement of the carrier mounting bed, the lever 72 is rotated counter-clockwise to transport the film by one frame, whereupon a signal generated by the light-sensing element $72a$ upon reception of light brings the backward clutch 34 into ON position. At this time, the image in the film is projected at a position indicated by broken outline $a_3$ on the screen 2. With the backward clutch 34 brought into ON position, the carrier mounting bed 12 is again moved in the reverse direction to transport back the film and the lever 72 operatively associated therewith is rotated counterclockwise. A signal generated by the light-sensing element $72b$ upon reception of light brings the backward clutch 34 into OFF position, thus stopping the carrier mounting bed 12. As a result, the film restores its original position and the projected image $a$ corresponding to the printed frame image lies again in the middle of the screen 2 and can again be observed.

The various processes succeeding to the exposure, such as development, paper feed, image transfer, image fixing, etc. are well-known and need not be described. The printed paper is discharged onto the paper reception unit 5. In the course of the slit-exposure, the light-sensing element $72b$ generates a signal due to counter-clockwise rotation of the lever 72, but it should be understood that such signal is cut off.

The position detecting mechanism is not restricted to the shown photoelectric means, but may alternatively be microswitches or other various means. The alignment between the center of the image and the optical axis of the projection lens need not be strictly exact but the center of the image has only to be aligned with the vicinity of the optical axis.

In case where the projection lens is changed over to insert the projection lens $17_2$ of magnification $\beta$ in the illuminating optical path, the microswitch 86 is actuated by rotation of the turret plate 81 to transport the film at a different velocity from the described above.

We claim:

1. A reader-printer comprising means for projecting an image in a recorded medium, screen means for receiving the image projected, a photosensitive medium for receiving the image projected thereon, means for moving said photosensitive medium, means for detecting the location of an image in the recorded medium to produce a detection signal, and means operative in response to the detection signal for moving the recorded medium to a reading position at which the projected image is viewed through said screen means and to a printing position where the projected image is recorded on said photosensitive medium.

2. A reader-printer according to claim 1, wherein said moving means is operably in response to a command to record an image to continue moving the recorded medium until said detecting means detects the end portion of the image.

3. A reader-printer according to claim 1, wherein the recorded medium is movable in synchronism with said photosensitive medium while an image is being recorded on said photosensitive medium.

4. A reader-printer according to claim 1, wherein said moving means is operably in response to the completion of recording of an image on said photosensitive medium to continue moving the recorded medium until said detecting means detects the approximate center portion of the image.

5. A reader-printer according to claim 1, wherein said projecting means comprises lens means, said detecting means producing the detection signal when the end portion of an image coincides with the optical axis of said lens means.

6. A reader-printer according to claim 1, further comprising means travelling over a distance greater than the distance over which the recorded medium travels, said detecting means detecting the position of said travelling means.

7. A reader-printer comprising a screen, a photosensitive medium, means for moving said photosensitive medium, means for projecting an image in a film on said screen on said photosensitive medium, means for detecting the location of an image in the film, and means operative in response to outputs from said detecting means for moving the film either between a first position for viewing the image on said screen and to a second position for printing the image onto said photosensitive medium.

8. A reader-printer according to claim 7, wherein said detecting means detects the end and center portions of the image to be printed.

9. A reader-printer according to claim 7, further comprising means for carrying the film, which is associated with said moving means.

10. A reader-printer according to claim 7, wherein the direction of the film movement is switchable in dependence upon the outputs from said detecting means.

11. A reader-printer according to claim 7, wherein said projecting means comprises means for projecting on said photosensitive medium a portion of an image to be printed and on said screen the remaining portion of the image.

12. A reader-printer according to claim 7, wherein said projecting means comprises a mirror for reflecting a portion of an image containing the optical axis of the projection path to project the portion of the image on said photosensitive medium with at least the remaining portion of the image being transmitted through the mirror to be projected on said screen.

13. A copying apparatus comprising means for projecting an image, screen means for viewing an image appearing thereon, a photosensitive medium, means for conducting said photosensitive medium to an exposing position, means for shifting the image synchronously with the movement of said photosensitive medium, means for detecting the location of the image to be exposed on said photosensitive medium, means operative in response to outputs from said detecting means for changing the location of the image, said detecting means being adapted to produce a first signal when the center of the image to be copied is located on the optical axis of the projection path, a second signal when the front end of the image is located on the optical axis, and a third signal when the rear end of the image is located on the optical axis, said changing means being adapted to shift the image in a first direction in response to an instruction to effect copying, in a second direction opposite to the first direction in response to the second signal, and in the first direction also in response to the third signal.

14. A copying apparatus according to claim 13, wherein said changing means is adapted to shift the image to be copied until receiving the first signal still after the entire image was exposed on said photosensitive medium.

15. A copying apparatus comprising optical means having lens means for projecting an image, screen means for receiving the image projected, a photosensitive medium for receiving the image projected, means for moving said photosensitive medium, means for moving the image, means for providing a command to copy the image, means for detecting the position of the image and operative in response to the coincidence of the optical axis of the lens means with either the end portion or the center portion of the image for producing a detection signal, and means operative in response to the detection signal for controlling the movement of the image to a predetermined position.

16. A copying apparatus comprising means for projecting an image, screen means for viewing an image appearing thereon, a photosensitive medium, means for conducting said photosensitive medium to an exposing position, means for shifting the image synchronously with the movement of said photosensitive medium, means for detecting the location of the image to be exposed on said photosensitive medium, means operative in response to outputs from said detecting means for changing the location of the image, said projecting means comprising a plurality of lenses of different magnifications, said lenses being selectively inserted into and retracted from the optical projection path.

17. A copying apparatus according to claim 16, further comprising means for controlling the moving rate of the image in dependence upon the magnification of a lens selected.

18. An arrangement for viewing or reproducing a microimage comprising a screen for viewing a microimage, means for conducting a photosensitive medium to an exposing position, means for projecting a microimage on the exposing position, means for shifting the microimage projected on the exposing position synchronously with the movement of said photosensitive medium, means for detecting the position of the microimage, and means operative in response to outputs from said detecting means for shifting the microimage to a first position for viewing the microimage on said screen or to a second position for reproducing the microimage.

19. An arrangement for copying a microimage comprising means for shifting a microimage, means for conducting a photosensitive medium to an exposing position, means for enlarging and projecting the microimage on the exposing position, means traveling a distance longer than the travel length of the microimage as the microimage is shifted, means for detecting the position of said traveling means, and means operative in response to outputs from said detecting means for controlling said shifting means.

20. A copying apparatus comprising means for projecting an image, screen means for viewing an image appearing thereon, a photosensitive medium, means for conducting said photosensitive medium to an exposing position, means for shifting the image synchronously with the movement of said photosensitive medium, means for detecting the location of the image to be exposed on said photosensitive medium, means operative in response to outputs from said detecting means for changing the location of the image, further comprising means for carrying a film having images recorded, said carrying means being operatively associated with said changing means, and means operatively associated with said carrying means travelling a distance longer than the travel length of said carrying means while said carrying means moves, said detecting means being adapted to detect the location of said travelling means.

21. A copying apparatus according to claim 15, wherein said optical means comprises means for projecting an image on said screen means and simultaneously projecting a portion of the image on said photosensitive medium.

22. A copying apparatus comprising means for projecting an image, screen means for viewing an image appearing thereon, a photosensitive medium, means for conducting said photosensitive medium to an exposing position, means for shifting the image synchronously with the movement of said photosensitive medium, means for detecting the location of the image to be exposed on said photosensitive medium, means operative in response to outputs from said detecting means for changing the location of the image, said projecting means comprising means for projecting on said photosensitive medium a portion of an image to be copied and on said screen means at least the remaining portion of the image, and said projecting means being adapted to project on said photosensitive medium a light beam containing a relatively smaller area in the vicinity of the optical axis of the lens means.

23. A copying apparatus comprising means for projecting an image, screen means for viewing an image appearing thereon, a photosensitive medium, means for conducting said photosensitive medium to an exposing position, means for shifting the image synchronously with the movement of said photosensitive medium, means for detecting the location of the image to be exposed on said photosensitive medium, means operative in response to outputs from said detecting means for changing the location of the image, said projecting means comprising means for projecting on said photosensitive medium a portion of an image to be copied and on said screen means at least the remaining portion of the image, and said projecting means comprising a slitted half-mirror provided in the vicinity of the optical axis of the lens means.

24. A copying apparatus according to claim 23, wherein a portion of a light beam reflected by said halfmirror is projected on said photosensitive medium with the remaining portion of the light beam transmitted being projected on said screen means.

* * * * *

UNITED STATES PATENT AND TRADEMARK OFFICE
CERTIFICATE OF CORRECTION

PATENT NO. : 3,988,064
DATED : October 26, 1976
INVENTOR(S) : YOSHIAKI SONE, et al.

It is certified that error appears in the above-identified patent and that said Letters Patent are hereby corrected as shown below:

Column 3, line 33, change "operably" to -- operable --.
Column 5, line 39, change "73c" to -- 74c --; line 40, change "73c" (second occurrence) to -- 74c --.
Column 6, line 27, change "ffor" to -- for --.
Column 8, line 8, change "from the" to -- from that --; line 50, change "screen on said" to -- screen or said --.

Signed and Sealed this

Twenty-second Day of February 1977

[SEAL]

Attest:

RUTH C. MASON
Attesting Officer

C. MARSHALL DANN
Commissioner of Patents and Trademarks